United States Patent [19]
Gode

[11] Patent Number: 5,899,072
[45] Date of Patent: May 4, 1999

[54] STEAM GENERATOR AND STEAM TURBINE DRIVING UNIT USING GASEOUS HYDROGEN AS FUEL

[76] Inventor: Gabor Gode, Boszormenyi ut 3/a II 1, H-1126 Budapest, Hungary

[21] Appl. No.: 08/601,026

[22] PCT Filed: Aug. 23, 1994

[86] PCT No.: PCT/HU94/00034

§ 371 Date: Feb. 23, 1996

§ 102(e) Date: Feb. 23, 1996

[87] PCT Pub. No.: WO95/06190

PCT Pub. Date: Mar. 2, 1995

[30] Foreign Application Priority Data

Aug. 23, 1993 [HU] Hungary ................................ 9302393

[51] Int. Cl.⁶ ................................................. F01K 25/00
[52] U.S. Cl. ...................... 60/670; 60/668; 122/235.22; 122/248; 180/65.2; 180/310
[58] Field of Search ............. 60/668, 670, 676; 123/DIG. 12; 122/235.11, 235.12, 235.14, 235.22, 248, 275, 367.1; 180/65.2, 69.5, 303, 304, 310

[56] References Cited

U.S. PATENT DOCUMENTS

| | | | |
|---|---|---|---|
| 3,139,866 | 7/1964 | Lumm et al. | 122/235.12 |
| 5,092,127 | 3/1992 | Miller | 60/668 |
| 5,385,214 | 1/1995 | Spurgeon | 60/659 |
| 5,513,600 | 5/1996 | Teves | 123/DIG. 12 |

*Primary Examiner*—Noah P. Kamen
*Attorney, Agent, or Firm*—Young & Thompson

[57] ABSTRACT

A steam generator a steam turbine driving unit, designed for the use of gaseous propellant, especially hydrogen, containing a gas supply unit, an air feeding unit (20), a steam generator (1) and steam turbine (77). The gas supply unit is provided with a supply container (8), a gas container (18), and with fittings used for filling up and gas supply. The air feeding unit is provided with instruments regulating air flow, and with an air filter (25). The steam generator is provided with a combustion chamber (1) having a ceramics wall, and the cooling pipes (31) adapted for steam generation are arranged in the combustion chamber (1). The steam turbine (77) is driven by the steam obtained from the cooling pipes (31) used for steam generation, and its shaft (36) represents the power output.

23 Claims, 8 Drawing Sheets

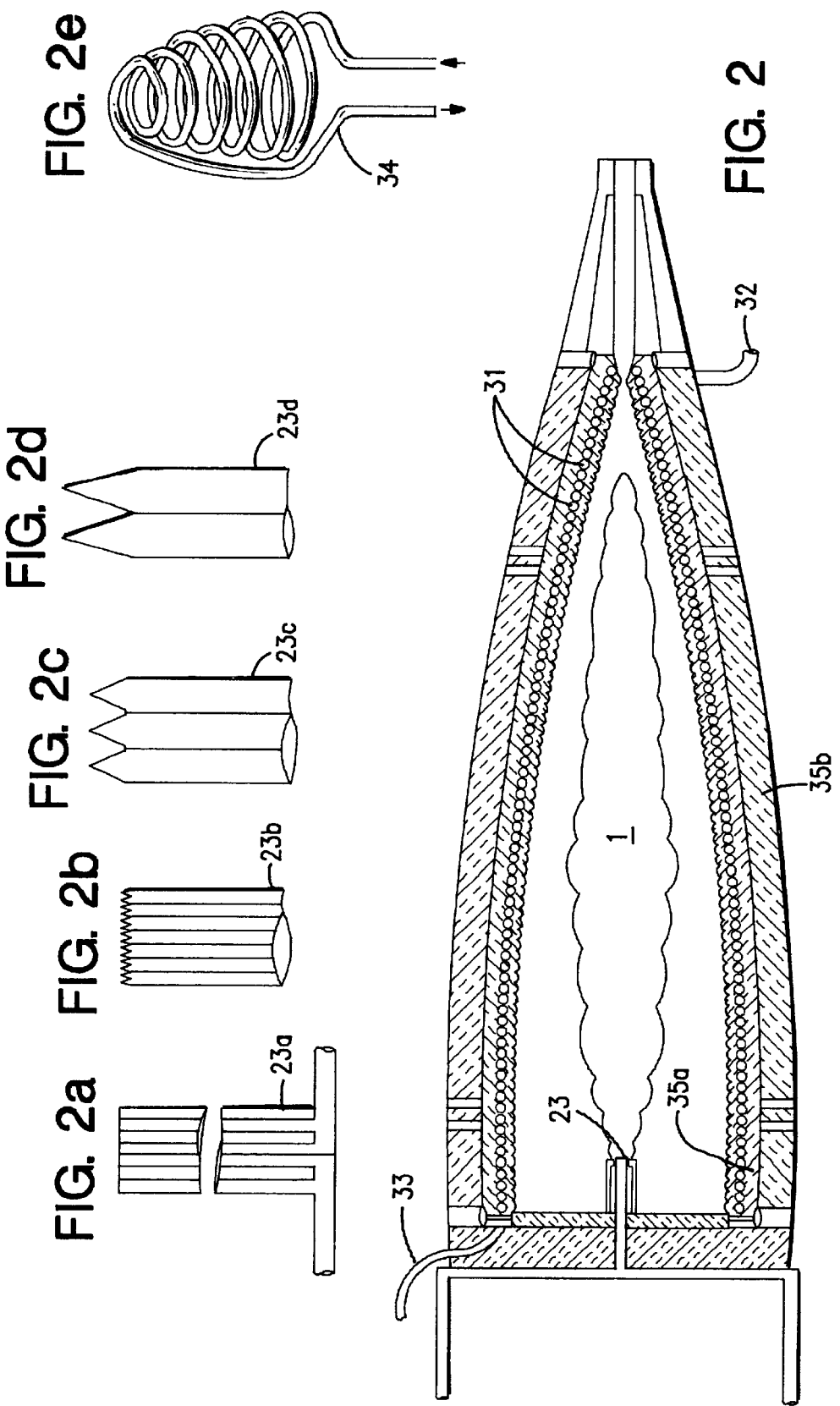

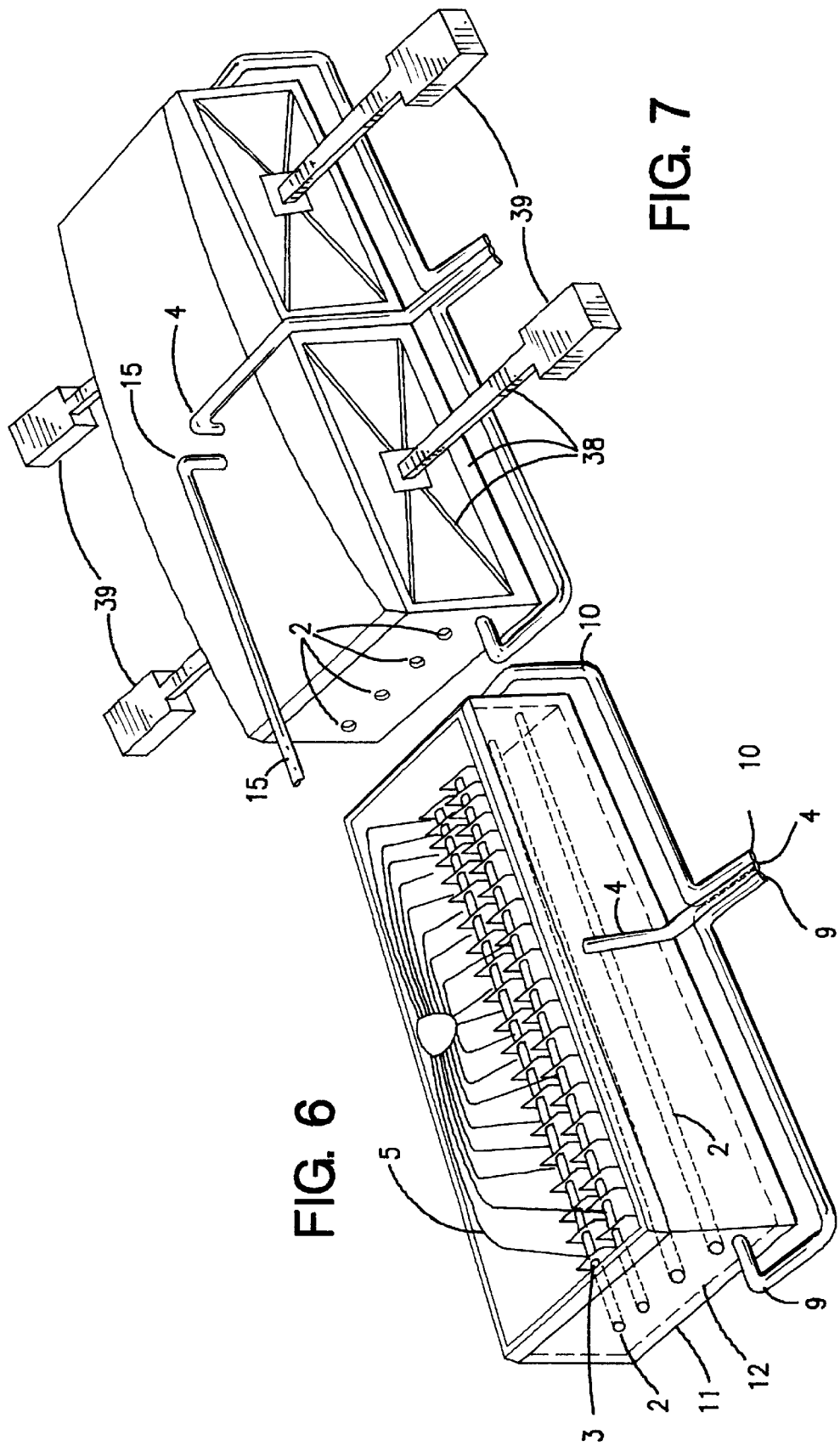

STEAM GENERATOR AND STEAM TURBINE DRIVING UNIT USING GASEOUS HYDROGEN AS FUEL

BACKGROUND OF THE INVENTION

FIELD OF THE INVENTION

The invention covers a steam generator and a steam turbine driving unit containing the generator which can be operated in a more advantageous way than conventional combustion engines, without air contamination, especially if hydrogen is used for fuel, because in this case the carbon dioxide emission accompanying the firing of hydrocarbons is avoided.

The most widely used fuels are hydrocarbons, primarily crude oil derivates. Consequently, oil reserves are expected to be exhausted sometime in the middle of the next century, according to prevailing estimates. Another disadvantage is the carbon dioxide emission, the harmful consequences of which are increasingly grave. With higher firing temperatures, the further drawback of nitrogen oxide emission arises, increasingly jeopardizing life and health.

To reduce the above indicated problems, the use of hydrogen as fuel has been considered for a long time. Hydrogen is available in unlimited quantities, and returns to its former state after firing. Hydrogen is the cleanest fuel, can be produced and used without losses, in a cycle, without emitting any substances than could be harmful to the environment. As the firing temperature can be reduced with suitable control, the production of nitrogen oxides can be reduced to a minimum level.

The general use of hydrogen as fuel requires the construction of various projects to resolve the task related to the production, storage and transportation of large quantities.

However, the use of hydrogen also creates a number of problems. At an environmental temperature, gaseous molecular hydrogen does not penetrate metals immediately. Hydrogen in atomic form is more dangerous. Atomic hydrogen can be generated at a temperature of above 430° F., in the presence of humidity, in case of corrosion and electrolysis, as well as a higher hydrogen pressure. At higher temperatures, the effect of hydrogen consists of a surface or inner decarbonization. The surface decarbonization occurs above 1050° F., and this reaction is caused by water vapor. During the inner decarbonization, hydrogen penetrates into steel at temperatures above 430° F., reducing the iron carbide to metallic iron by means of an internal reaction, creating methane. The products of the reaction gather at grain boundaries and in small crevices, causing the reduction of plasticity. In graver cases, they bring about the growth of local, internal pressures, and consequently the formation of blisters or fractures. (See P. Webb; C. Gupta: metals in hydrogen environment, Chem. Eng. October, 1984). The stress type fractures caused by hydrogen are sometimes mentioned as a delayed rigid fracture caused by hydrogen or an internal hydrogenous rigidity. This used to happen when the metal was exposed for a long period of time to tensile stresses caused by load lower than the yield limit.

At lower temperatures, below 430° C., brittleness or the formation of blisters takes place. The brittleness or rigidity is caused by the hydrogen penetrating into the metal, reducing the plasticity and tensile strength of the metal.

The effect of hydrogen on metals can be reversible or irreversible. In case of an irreversible rigidity, the absorption of hydrogen is accompanied by a damage arising in the metal structure, which remains even when the last traces of the hydrogen itself have left the metal. One example is copper, in which hydrogen, having diffused into the metal at a temperature of above 300° C., enters into reaction with the inclusions, whereby water vapor and metallic copper are produced. The increased pressure associated with high temperature is sufficient for the inclusions to widen themselves, making the texture of the metal porous and deteriorating its strength. The reversible transformations can be reversed by driving out the hydrogen, and the original value of plasticity can be regained.

Hydrogen as a fuel has very good characteristics: its combustion temperature and heating value are high, it is able to burn at a low concentration, without producing any smoke. These features allow it to be burned in an internal space (oxidation), as the thermal energy can be used with a high efficiency.

The burning of hydrogen in a combustion chamber is advantageous compared with natural gas. It is known that the radiation coefficient of the flame (in case the flame does not contain solid particles) is directly related to the triatomic gases, i.e. in this case with carbon dioxide and water.

In its combustion product (containing exclusively water vapor, having a higher radiation than that of carbon dioxide), the hydrogen gas has a higher quantity of triatomic gases, therefore its radiation ability is higher than that of natural gas. The radiation of a hydrogen flame is higher than that of natural gas, and its outer parts are hotter, therefore its radiation is good.

With respect to heat transfer characteristics, the adiabatic temperature (2100° C.) of hydrogen is higher than that of natural gas (1950° C.). The combustion of hydrogen requires less air (0.80 $m^3$/n/kWh) than does natural gas (0.96 $m^3$/n/kWh). For a given power and torque, the heat transfer of hydrogen gas is 10% better than that of natural gas.

The hydrogen/air mixture is ignited at a mixture of 4 as well as 75% and has a high inflammation speed. The flame supplied by hydrogen during tests is extremely stable, being calm without artificial stabilization, at any pressure level.

All of this shows that the burning of hydrogen does not represent any difficulty either in an open or a closed combustion space. Its good radiation, heat transfer and stability facilitate energy transformation with high efficiency. Its efficiency can be considerably higher than that of hydrogen burned in a combustion engine, because the high temperature and energy of the chemical reaction accompanying the explosion can only be used with a considerable loss, due to friction, the permanent cooling applied because of overheating, and the cooling by water injection applied for the reduction of nitrogen oxide development. At the same time, the transformation from the gaseous state into the liquid state (development of water and water vapor) influence the resulting pressure conditions in a disadvantageous way, and the metal parts of the combustion engine are exposed to intensive corrosion by the created water fraction.

It is obvious that—despite the many advantageous characteristics of hydrogen—a number of obstacles have to be overcome to use hydrogen as fuel.

U.S. Pat. No. 4,573,435 (SHELTON) describes a method and apparatus for the production of hydrogen to be used as a diesel engine additive. In this procedure, water is sprayed on a pipe bundle of a heat exchanger delivering the hot exhaust gases. The velocity of spraying is so high that a considerable part of the water disintegrates into hydrogen and oxygen. This gas mixture and the remaining steam are fed into a combustion chamber after being mixed. The approach has the disadvantage that only a small amount of thermic water decomposition can be achieved in this way, and the obtained hydrogen and water vapor damage the combustion engine considerably.

U.S. Pat. No. 4,253,428 (BILLINGS et al.) describes a hydrogen fuel system used together with, or as an alternative to, a hydrocarbon fuel system in a vehicle, containing a combustion unit as well as a unit mixing the introduced hydrogen with air.

This solution also has the disadvantage that the combustion engine is damaged by hydrogen. Also, nitrogen oxide contaminants are produced during combustion at high temperatures, the quantity of which cannot be reduced.

U.S. Pat. No. 4,528,947 (OLIVERA) describes an apparatus functioning with solar oxy-hydrogen where the electrolyzation cell producing hydrogen and oxygen is integrated into the cooling system of a combustion engine. One of the electrodes consists of the engine-house, the other is the cooler. The developing hydrogen is stored by the hydride contained in the electrolyte.

This solution has the disadvantage that the combustion engine is damaged by the hydrogen, penetrating into the metal and causing its destruction. A further disadvantage of this solution is that there are nitrogen oxide contaminants produced during the combustion at a high temperature.

Patent No. EP 0 153 116 (SUTABIRAIZA CO.) describes a method for producing mechanical energy by means of a multi stage utilization of $H_2O$ plasm. The plasm is obtained through water dissociation and the reactive pressure is maintained by the plasm. The mechanical energy is gained by the explosion of the electrically conducting plasm in a piston engine.

This solution has the disadvantage that the metallic structure of the piston engine is damaged by the hydrogen. A further disadvantage of this solution is that the piston engine is overheated during the combustion of the plasm at a very high temperature, even though appropriate cooling is applied, leading to an intensive wear.

The hydrogen can be stored and transported in the known way, i.e. absorbed in metal, in the form of a metallic hydride, in a hydride container.

The firm of Daimler-Benz performed tests with vehicles provided with the above-mentioned hydride containers. The volume of the hydride accumulator amounted to 65 liters, its mass to 200 kg, thus a distance of 200 km could be covered with an engine having an output of 44 kW. A doubling of the distance to be covered was expected from an improvement of the hydrides. Similar tests have been performed elsewhere, too, and it was found that the traditional combustion engines used in vehicles can be used with hydrogen without any difficulty. Considerable changes were only needed at the carburetor and the ignition units. This way, the former engine structure could be retained and an entirely new engine need not be developed. This approach is of limited utility, however, because only a low efficiency can be achieved if the traditional engines are fueled with hydrogen, and the hydrogen has a damaging effect on the metallic environment, and this effect cannot be eliminated. Therefore, changes are necessary, in the form of a driving unit resisting the damaging effect of hydrogen and having a suitable efficiency, allowing its economic use in an era of limited energy resources.

SUMMARY OF THE INVENTION

The invention provides a propulsion unit which can be operated more advantageously than the previous ones, specifically with less air contamination.

The invention further allows the use of hydrogen as fuel, because in this case the carbon dioxide emission accompanying the combustion of hydrocarbons is practically eliminated.

The invention further provides a propulsion unit in which the combustion temperature can be reduced through a regulation of the fuel combustion, also resulting in reduced emission of nitrogen oxides.

This invention also provides a steam generator to be used advantageously with the above-mentioned propulsion unit.

The invention further provides a hydrogen fueled propulsion unit having a metallic hydride as an energy source and equipped with a hydride container to store the above metallic hydride.

The invention further provides a propulsion unit with which environmentally friendly motor vehicles can be manufactured.

It was recognized that by burning hydrogen mixed with oxygen from the air in a combustion chamber made of ceramics and providing steam production, the energy obtained by the combustion, oxidation can be utilized with improved efficiency, and as the combustion process is regulable the combustion temperature can be maintained below a certain value, resulting in a reduction of the emitted nitrogen oxides to a minimum value. At the same time, the resistance of ceramics to hydrogen is better than that of the combustion engine parts.

It was also recognized that all of the thermal energy is utilized if the cooling water itself is used for the production of high pressure steam suitable for the energy transformation, whereby the operation temperature is lower than that of the combustion engines, contributing to the reduction of nitrogen dioxide emissions, maintaining their quantity at a minimum level. This energy saving procedure of functioning without cooling guarantees in a regulable way the lower operation temperature where the nitrogen oxide development can be kept at a minimum level. This minimum quantity can be entirely filtered out with an incorporated catalyzer.

The advantages of the solution in accordance with the invention can also be supported by former experience gained during the combustion of hydrogen in a closed space.

The steam-turbine propelling unit designed for achieving these goals is suitable for the operation with a gaseous propellant, especially hydrogen and contains the following units:

a gas supply unit, equipped with a supply generator, a gas container and ducts suitable for fuel filling and supplying gas;

an air feeder unit, equipped with air flow regulating instruments and an air filter;

a steam generator, equipped with a combustion chamber with a ceramic wall, connected with the above-mentioned gas supply unit and the air feeder unit, provided in its wall with cooling pipes suitable for steam generation;

a steam turbine propelled by the steam obtained from the cooling pipes of the steam generator, equipped with an output driving shaft.

The supply container is preferably a hydride container containing a metal powder or granulate storing the hydrogen as propellant in the form of a metallic hydride.

BRIEF DESCRIPTION OF THE DRAWINGS

The invention is described in detail according to the attached drawings, showing further details and advantages of the invention. The drawings include the following figures:

FIG. 2 is a sectional drawing of the steam generator of the propulsion unit according to FIG. 1.

FIGS. 2A through 2D illustrate different alternatives of the jets to be used for the steam generator according to FIG. 2.

FIG. 2E is a view of the re-heating pipe bundle.

FIG. 6 is an internal view of the metallic hydride container, according to FIG. 3.

FIG. 7 is an upper view of the metallic hydride container, provided with a fixation and supporting structure.

DETAILED DESCRIPTION OF THE PREFERRED EMBODIMENTS

Figure 1:
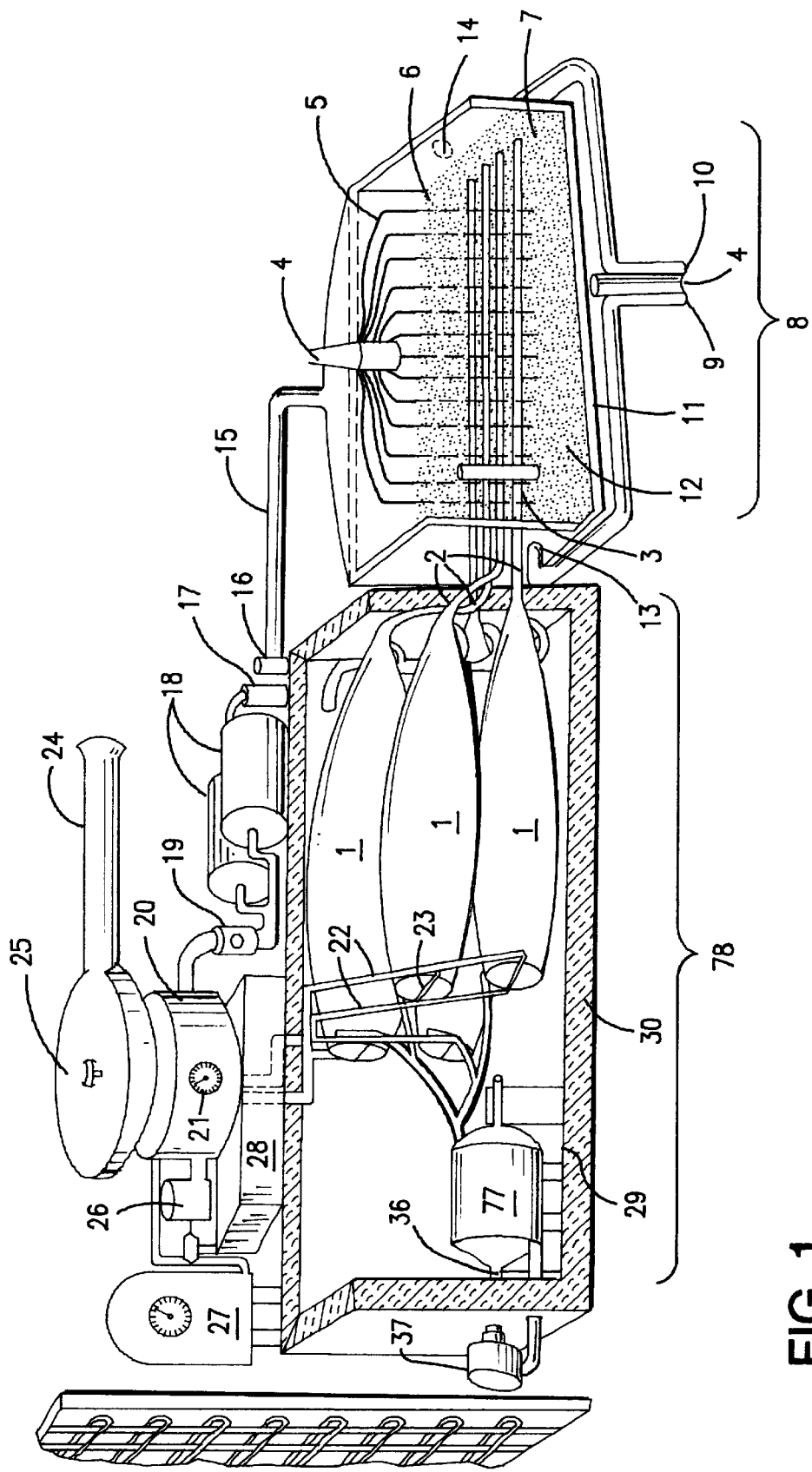
FIG. 1 is a partially sectional view of the hydrogen propelled alternative of the propulsion unit designed according to the invention.
Figures 3, 5:
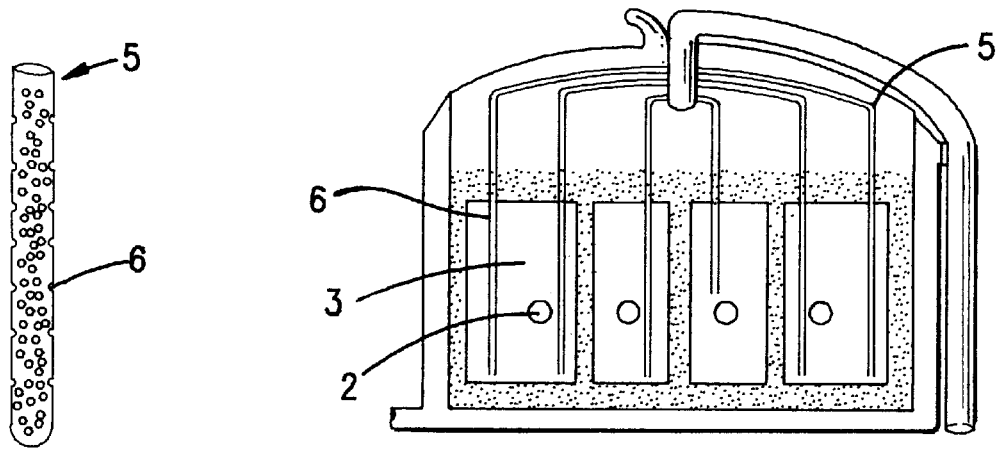
FIG. 3 is a sectional drawing of the metallic hydride container.
FIG. 5 illustrates a hydrogen supply pipe with perforated wall of the metallic hydride container, according to FIG. 3.

FIG. 1 shows the hydrogen propelled alternative of the steam turbine propulsion unit according to the invention, also containing the steam generator according to the invention. The hydrogen is stored in a double wall type container (8) for the storage of the metallic hydride, connected to the jets of the steam generators formed by the combustion chambers (1) made of ceramics, through the pipeline (15) of the hydrogen supply. The pipeline (15) includes a pressure and flow control unit (16), pump (17), pressurized hydrogen containers (18), and pressure regulator (19), connected to the feeding unit (20).

The air supply unit includes an air filter (25) and a pump (26) connected to an air intake pipe (24), as well as a container (27) of pressurized air. The pump (26) is connected to the feeding unit (20), and this is connected to the jets (23) ending at the combustion chamber (1) made of ceramics, through appropriate pipelines.

The above-mentioned combustion chambers (1) made of ceramics are situated in the casing (78) provided with an insulating layer and incorporating the energy transformation units, as well as in the container. Also positioned here is a turbine (77) supplied with pressurized steam by the steam generator (1). An output shaft (36) of the turbine (77) delivers the power and this shaft is connected to a driving wheel or pulley (37) located outside the casing (78).

The double wall type container (8) designed for the storage of the metallic hydrides is provided with a filling (7) absorbing the hydrogen in the form of a granulate or powder. In the upper part of this container, the hydrogen supply pipes (6) with perforated walls submerge into the hydrides. They are connected with the pipe (4) for filling up with hydrogen through the distribution pipes (5). The pipe (4) exits the container (8) at its upper part. The pipe (4) for filling up with hydrogen is only used during such filling operation. Otherwise, it is closed with a valve and/or cap at connection point (75) indicated in FIG. 8.

Into the filling (7) to be transformed into a metallic hydride compound, the pipes (2) provided for heating and draining combustion products submerge in a transverse direction, connected to the output of the combustion chamber (1). The container (8) for metal hydrides is designed with the external (11) and internal (12) container walls, having a common water space between them, connected through the intake hole (13) with the pipeline (9) draining cold water, with the pipeline (10) draining hot water.

The casing (78) provided with an insulating layer and containing the steam generator (1) is designed with a solid internal wall (2) and mantle, provided with the insulating coating (3).

FIG. 2 shows the combustion chamber (1) of a steam generator to be used for other purposes, too. The combustion chamber (1) is equipped with an internal wall (35a) made of ceramics, with the steam generating spiral pipeline (31) situated in its wall. One of the ends of the pipeline (31) is connected with the water supply pipe (32), and the other one with the steam pipeline (33) conducting the steam produced. The air and hydrogen, as well as their mixture are fed into the combustion chamber (1) by the jets (23). The design and possible alternatives of the jets are indicated in FIGS. 2A–2D as elements 23A–23D. The hydrogen coming from the container (8) is fed by the feeding unit (20) into the combustion chamber (1) through the jets (23). The combustion chamber (1) is an almost entirely closed ceramic unit, and the combustion of hydrogen takes place in this chamber or space. The different types of ceramics and glass ceramics have a good resistance against heat and the damaging effects of hydrogen. In the wall of the combustion chamber (1), the pipeline (31) of steam generation is led from the section of the combustion chamber (1) having the smallest diameter, designed with a conic character, towards its section having a larger diameter, i.e. towards the jets (23). The pipeline (31) divides the ceramic walls into two parts, namely an internal wall having a smaller diameter and an external wall having a larger diameter. The external wall consists of two equal parts, whereas the internal wall is preferably made of segments, and both walls are united by bolts. In another possible design, the wall of the mantle of the combustion chamber (1) provided with a ceramic wall and having a frustum shape is hollow, and the pipe coil is formed by the hollows. Its density shall naturally be in accordance with that of the ceramics. The mantle is connected with the plate bearing the jets (23) in a separate or inseparable way. To the output and input of the pipeline (31), appropriate stubs can be used, to connect the ducts (32) and (33).

In another possible design alternative, in the inner part of the combustion chamber (1) of a conic shape, the pipeline (31) can also be placed so that it touches the internal surface or is set in recesses penetrating the surface to a maximum of the half the pipe diameter. In this case, the pipeline (31) is made of a material resistant to the damaging effects of hydrogen and having an appropriate strength. The combustion chamber (1) representing the steam generator is coated from outside with the coating (35b). In the case of using the steam re-heater (34), the pipe coil (34) also made of a material resisting the damaging effect of hydrogen is located inside the combustion chamber (1), in its axial line.

Beyond the double wall type container (8) for metal hydrides and the above-mentioned elements, and the appropriate pressure storing and feeding units, the hydrogen supply system indicated in FIG. 1 includes preferably electromagnetically operated safety valves, backlash valves and various switch-off valves, as well as a pipeline having an appropriate resistance against hydrogen. The pipeline delivering hydrogen (1) begins at the container (8), specifically from its upper part and passes through the pressure and flow control unit (16) and the pump (18), pressing the hydrogen into the containers (8). From here, the hydrogen is delivered through the pressure regulator valve (19) to the feeder (20) provided with the electromagnetic safety valve (21), then through the distributing pipeline to the jets (23) entering the combustion chamber (1). The feeder (20) contains a regulator tongue or rings guiding the lamella, an idling blocking, springs, Bowden wires and the suitable seals. They are made of materials resistant to hydrogen. The preheating equipment (28) is provided with an input and output connection and contains pipelines equipped with heat transfer lamellas. The casing of the safety valve (21) of the feeding electro magnet (20) contains a pipeline provided with a suitable air gap. The safety valve (21) of the feeding electro magnet (2) contains a casing, and electromagnetic disk (pulling in disk) provided with a suitable air gap. It is automatically controlled. The air supply elements can be assembled from standard parts usually used in motor vehicles. The air pump (26) can operate with several stages automatically, and is connected to the container (27) of pressurized air. The air is led from here into the preheater (28). The air is fed similarly to the hydrogen.

Figure 4:
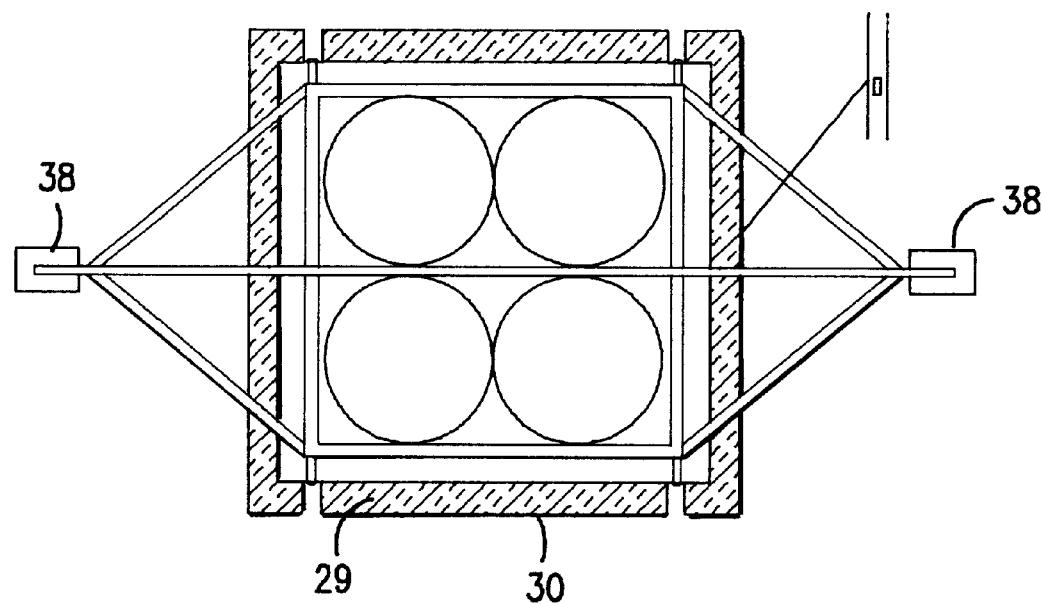
FIG. 4 is a section of the steam generators of the drawing of the propulsion unit according to FIG. 1, taken in a plane.

As mentioned before, the combustion chamber (1), the steam pipes (33), the condensed water ducts (32), as well as the one or more steam turbines (77) are situated in the insulated wall casing (78). The shaft (36) starts from here and the driving pulley (37) is connected from outside. The casing (78) is designed with a double wall, provided with an insulation of appropriate thickness and a suitable supporting structure as it is shown in FIG. 4. The casing itself (78) can be opened at least at one of its sides, and its internal wall, i.e. its parts are fastened to each other by screws. The supporting structure (39) provided with a suitable stiffening part is connected to these parts. The internal solid wall is covered by a hard, shock and heat resistant coating having a suitable thickness and insulating effect. It is fastened to the internal wall by sticking or another kind of solid fastening. The right or left hand side of the casing (78) can be opened by screws. The pipelines provided with an appropriate insulating coating run through the openings situated on the casing (78), and are sealed in a suitable way.

In case the propulsion unit contains two turbines, the exhaust vapor of the first turbine is reheated by the pipe coil (34), as it is shown in FIG. 2E. The pipe bundle or pipe coil (34) is absolutely independent form the steam generating pipe (31) serving for steam generation, and the reheating pipe (34) is located inside, compared with the pipeline (31), inside the combustion chamber (1), in its central line, arranged in bundles consisting of curved pipes connected by two circular rings. Its material resists the damaging effects of hydrogen. In this reheating pipe (34), the second turbine (77) is propelled by reheated steam, which expands there. In case that reheating pipe bundle (31) or (34) is freely arranged inside the combustion chamber (1), it shall be manufactured of a suitable material and fastened to the internal surface of the combustion chamber (1).

In its preferable design of the propulsion unit according to the invention to be operated with hydrogen, the hydrogen is stored in the form of a metallic hydride compound that has been used with success. The hydrogen is bound by a metal compound used in the form of a powder or granulate, and this is the load of the container (8). Magnesium hydride seems to be the most suitable substance for this purpose. During an exothermic reaction, the magnesium absorbs a high quantity of hydrogen gas, and the density of hydrogen storage is near to that of hydrogen stored in a liquid state.

The container (8) for metallic hydrides is equipped with an internal wall (12), consisting preferably of a heat resistant, glass fibre reinforced artificial resin, e.g. epoxy resin, to avoid the damaging effects of hydrogen. From the highest point of the container (8), the pipeline (15), made preferably of plastic starts to duct the hydrogen developing from the load, and the hydrogen is led through the pressure and flow control unit (16) to the pump (17). Also into the container (8), to its highest point, together with the pipeline (15), a further pipe (4) made preferably of plastic is led, branching in the inside into the distribution pipes (5), which end in very many pipes (6) having perforated walls. The pipes (6) are preferably made of plastic. Their perforated section entirely submerges into the layer of the load. The pipe (4) is led outside the container (8) to the filling up connection (75) situated on the side of the motor vehicle, provided with a closing cap and switch-off valve.

The wall of the external container (11) consists of steel, alloyed preferably e.g. with chromium, titanium, vanadium, zirconium or columbium, provided on its internal surface with a corrosion resistant coating, surrounding from three sides a hollow, with the wall of the internal container (12). To the wall of the external container (11), the ducts (8) and (10) are connected at the holes (13) and (14). During filling up through the above ducts cold water flows in through the hole (13). After circulating there, the water is warmed up by the heat developing during the absorption of the hydrogen, and leaves the container through the hole (14). After the completion of the filling up process, the circulated water can be drained through holes (13) and (14).

During filling, the hydrogen flows through the pipeline (14), the distribution pipes (5) and the perforated pipes (6) into the layer of powder or granulate representing the load of the container (8), which is gradually transformed into a metallic hydride during the absorption of hydrogen.

During filling, the quantity of the added hydrogen, then the saturation of the metallic hybrid, i.e. the completion of fill-up, are indicated by an instrument attached to the container (8), if necessary with a sound signal, as well.

From the load of container (8), the hydrogen can be fed by heating. The procedure takes place with the hot, wet combustion products, leaving the combustion chamber (1) and container approximately 30% water vapor and mainly nitrogen. The combustion products are ducted by the pipes (2).

Figure 10A:
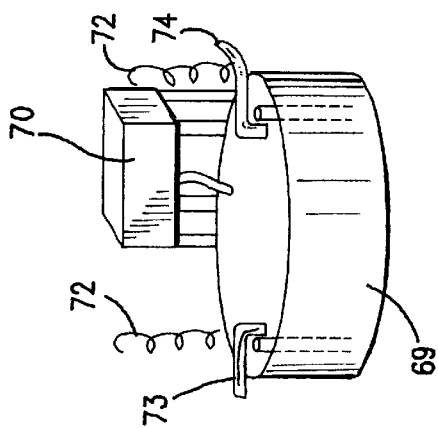
FIG. 10A is a view of an additional hydrogen and oxygen developing unit.
Figure 10:
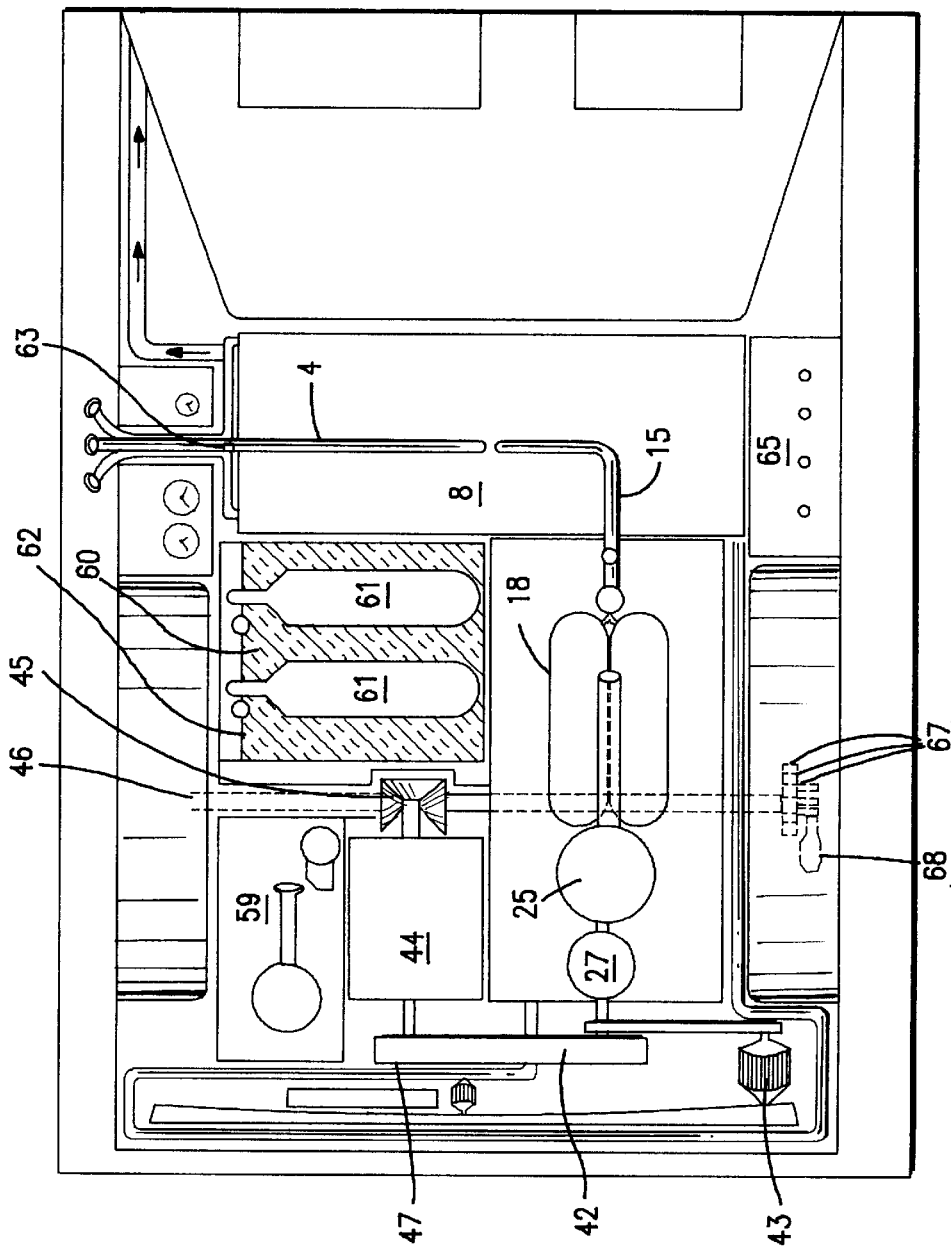
FIG. 10 is a top view of the steam turbine propulsion unit, provided with an auxiliary propulsion unit in the form of a combustion engine, mounted in a motor vehicle.
Figure 12B:
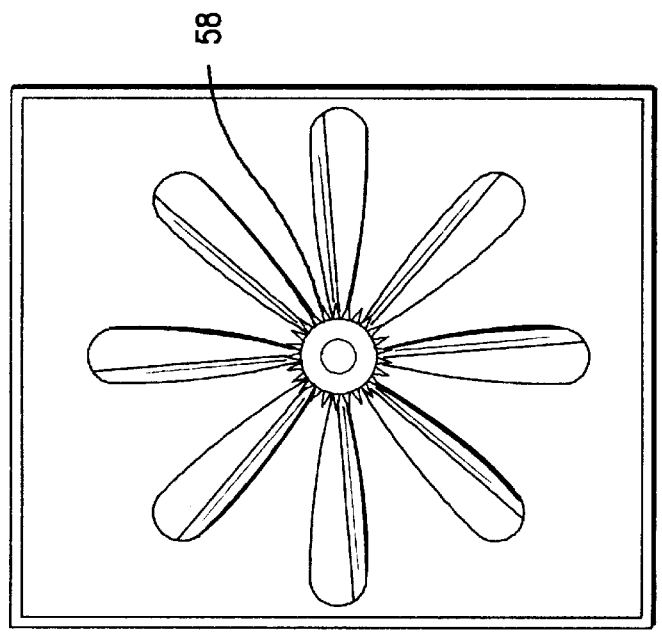
FIG. 12B illustrates the cooling block according to FIG. 12A, seen from the ventilator impeller.
Figure 12A:
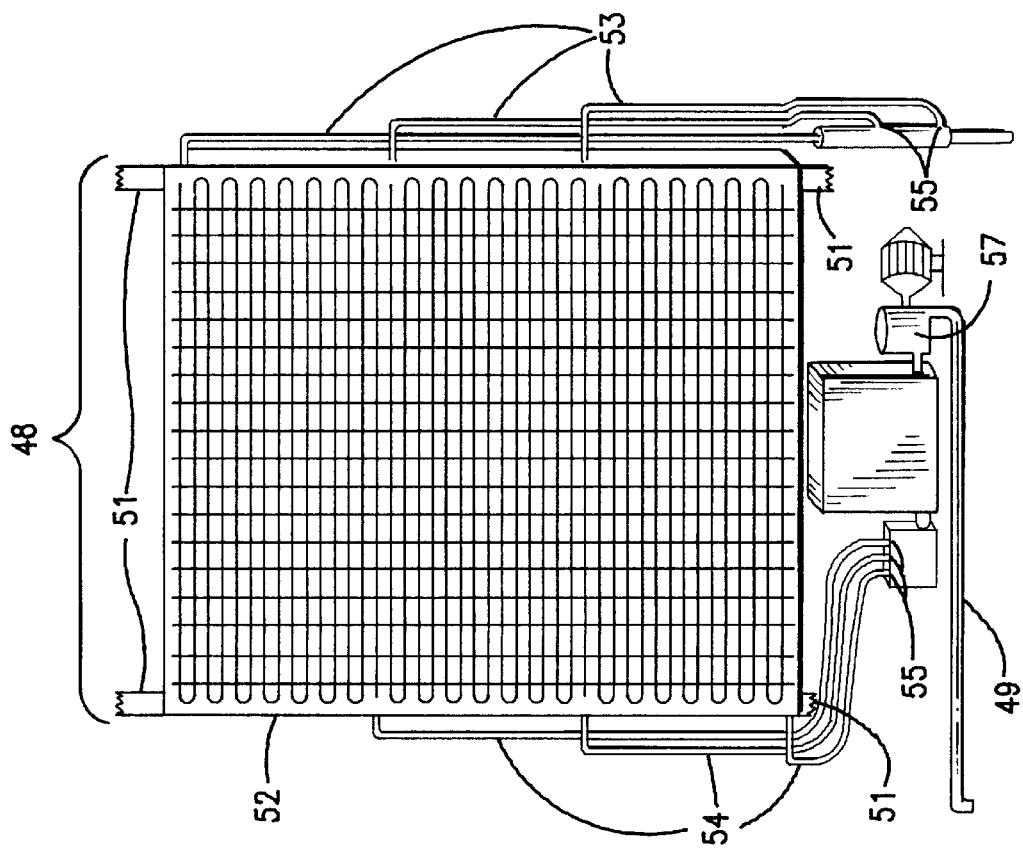
FIG. 12A is a front view of the cooling block and the connected additional units.

In case of the embodiment indicated in FIG. 10, the auxiliary driving engine (59), a combustion engine, is used for starting. The exhaust gases of this engine can also be used for heating, ducting them through the pipe (2) or another, separate pipe. During starting, the hydrogen can also be released in a way not supplying the combustion chamber (1) at the beginning with hydrogen but with another gas to be easily stored in liquid form, e.g. propane-butane gas.

The hot combustion products leaving the combustion chamber (1) reach the pipes (2) heating the container (8) for metallic hydrides either directly or through the container (40) collecting and preheating the supply water.

The pipes (2) are manufactured of anti corrosion materials, e.g. ceramics, or glass fibre reinforced plastics having advantageous heat transfer characteristics, provided with a slope suitable for draining the condensed water. To improve the heat transfer and maintain a uniform temperature, heat transfer plates (3), ribs are fastened to the pipes (2), submerging into the load of the hydride container (8).

On the external wall (11) of the hydride container (8), stiffening parts (38) are attached. They may be fastened to and supported by the vibration damping rubber blocks (39). In a motor vehicle application, the rubber blocks (39) are fastened to the frame of the vehicle, e.g. into appropriate holes. Naturally, more than one metallic hydride container can also be built in, to be filled up or emptied simultaneously or subsequently, by means of a suitable fill switch.

Figure 11:
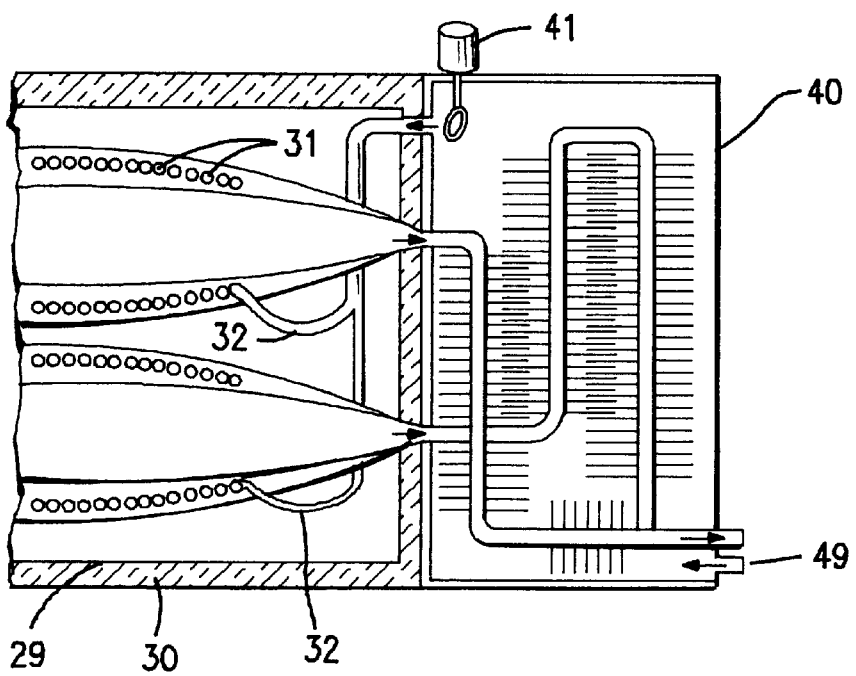
FIG. 11 is a section view of the connection of the supply water collecting and preheating container to the steam generator.

The combustion chamber (1) representing the steam generator is coated from outside by a hard or solid, shock and heat resistant insulating wall having a suitable thickness. To the narrowing end of the internal space of the combustion chamber (1), the appropriately designed, heat resistant pipeline (2) is attached, to duct the developing hot vapors, steams and the nitrogen of the air, i.e. the combustion products. This pipeline is led outside through the supply water preheater (41) and the container (8) for metallic hydrides indicated in FIG. 11. During passing through, it transfers the humidity content of the combustion product in the form of condensed water, and this condensed water is collected in the water tank, to be drained outside. The water is collected with the collecting tank (76) provided with a leading through valve. The steam developed in the pipeline (31) led in the wall of the combustion chamber (1) or surrounding its combustion space is able to drive the turbine (77) and perform mechanical work. Strength and wall thickness of pipeline (31) shall be dimensioned in accordance with the required pressure. The strength and wall thickness of the pipeline (34) reheating the steam coming from the turbine (77) shall be dimensioned in a similar way. The pipeline (31) is supplied by the supply water duct (32), connected to the supply water container (49), and the water is delivered by the supply water pump (41).

The turbines (77) function with steam. To achieve a suitable power and pressure, a steam turbine having a good efficiency shall be selected. It is advisable to apply two or three steam turbines, to achieve the maximum efficiency. In this case, the steam turbines work with decreasing pressure, and the exhaust steam of the previous turbine is led through a reheating pipeline (34) and expanded in a steam turbine functioning with medium or low pressure. The steam of the second turbine can be led in case of appropriate pressure and energy conditions into a steam turbine functioning with a lower pressure, after a necessary reheating. The pipelines connecting the combustion chamber (1) and the steam turbines (77) can be provided with a heat insulation if necessary.

The driving output of the turbines (77) consists of the shafts (36), manufactured of steel or a steel alloy having a suitable strength. They are naturally dimensioned under consideration of the relative mechanical stress, and their end is attached to an appropriately dimensioned transmission, pulley, or clutch. If necessary, it can be provided with a band pulley, chain wheel or gear, transmitting the energy to the clutch (44) or to another drive. The casing (28) containing the combustion chambers (1), the turbine (77), and the other ducts and structural elements is fastened and suspended by the stiffening supporting structures (38), which also fasten the combustion chambers (1) and its ceramics elements, as well as strengthen and fasten the individual elements, the turbine (77) and provide the entire unit with a self supporting character. To this structure (38), the ceramic bodies, coatings, casings, and pipelines can be fastened by bolting, clamping or another appropriate way. To fix the entire casing (28), a lower fastening can also be used instead of the lateral fastening (39) according to FIG. 4.

The preheating container (40) collecting the supply water can be provided with the usual elements, deaerator and safety valves. Its wall is insulated and it has in its inner part curved or spiral pipelines, forming a heat exchanger connected with the inner part of the combustion chamber (1). This heat exchanger is heated by the combustion products leaving the combustion chamber (1). The preheated supply water may be delivered from the container (40) by a computer controlled multi stage pump (41) through the supply water ducts (32) into the steam producing spiral pipes (31) situated or formed in the wall of the combustion chambers (1).

The turbine (77) is part of the heat transfer system and may also contain further units used for the forwarding of mechanical energy, e.g. clutches, pulleys, automatic clutches and similar elements. The starting point of the power transmission system is the shaft (36) of the turbine or turbines, connected through a small pulley with the electric energy generating aggregate. It is also possible to fasten a larger pulley to the shaft (36), and this pulley (37) transfers the energy to the central clutch (44), as well as to the wheels of the vehicle. The power transmission is implemented by gears, belts, chains or similar elements.

Figure 9:
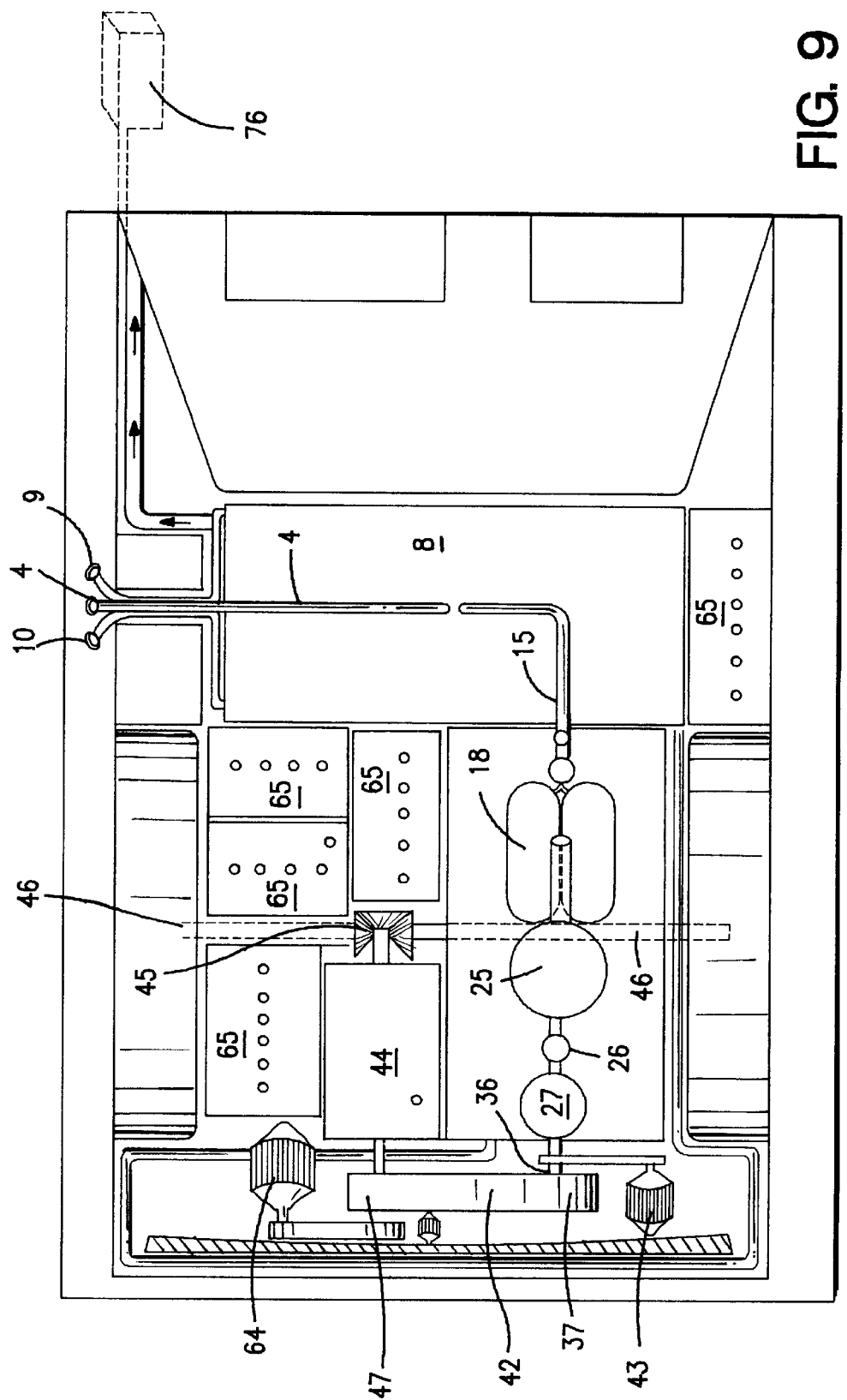
FIG. 9 is a top view of the steam turbine propulsion unit, provided with an electric auxiliary propulsion unit, mounted in a motor vehicle.

In case of applying the propulsion unit for a vehicle, preferably also auxiliary propulsion equipment is included. The location of the auxiliary propulsion equipment is shown in FIGS. 9 and 10. FIG. 9 shows auxiliary electrical propulsion equipment, containing the accumulators (65) and the electro motor as auxiliary propulsion equipment (64) supplied by them. The driving pulley (37), connected to the shaft (36) of the steam turbine (77), is in driving contact with the driving pulley (47) of the central clutch (44), through the driving pulley (42). The electro motor of the auxiliary propulsion equipment is connected to the same central clutch (44) through a belt transmission. The central clutch (44) contains a gear box if necessary, connected to the driving shaft of the vehicle, through conical wheels (45). The previously not indicated shafts of the vehicle are situated on the driving shafts (46). FIG. 9 also shows the arrangement of the double wall type container (8) for metallic hydrides, the attached pipeline (4) for filling it up with hydrogen, the pipeline (9) for the cold water supply, and the pipeline (10) for draining hot water. FIG. 9 shows also the air filter (25), the pump (26) and the pressure storage container (27), related to the hydrogen pipeline (15) and the attached pressurized hydrogen container (18).

FIG. 10 shows a propulsion unit arranged in a motor vehicle, similar to that indicated in FIG. 9, and contains auxiliary propulsion equipment (59) driven by an Otto engine. The auxiliary propelling equipment (59) includes an Otto engine supplied by gas cylinders situated in the fuel cylinder fixing (60). The auxiliary propulsion equipment (59) is also connected for driving purposes through transmission belts to central clutch (44). The auxiliary propulsion engine transfers the power to the central clutch (44) through an electro magnetic pulling in pulley or through a clutch. Power transmission takes place in a way identical to the case indicated in FIG. 9. FIG. 10 also shows equipment (66) utilizing braking energy. This equipment is connected to the driving shaft (46) of the vehicle through the gear transmissions (67). The equipment (66) utilizing braking energy contains the electric energy generating aggregate (68), coming into a driving contact with the driving shaft (46) during the braking process.

The propulsion unit designed according to the invention is provided with a cooling system containing the cooling block (48). The cooling block (48) includes a heat extraction network, automatically controlled stage regulators, valves, a supply water collecting tank, pump and ventilator. The cooling block is appropriately placed in the front part of the vehicle, and contains preferably three units functioning independently from each other. The individual cooling units contain horizontal pipes bent in meander shape, arranged at the lateral limiting wall situated in the vertical plane of the cooling block (48). Sheets increasing the heat transfer surface are placed on these pipes. The cooling block (48) is structurally supported by the supporting bar system (51), and the block is provided with a lateral casing. The agent arriving from the input duct is distributed by the electro-magnetically controlled valves (55). These valves switch on one or more stages as needed. In case of a temperature increase, the control equipment switches on more and more cooling stages, as needed. When the engine is idling, only one stage is working and in this case the agent is led into the cooling block (48) by the intake pipes (53). From here, the cooled agent is led by the ducting pipes (54) into the collecting tank (56) of supply water, then into the preheating container of the supply water, by the supply pump (57).

To increase the efficiency of cooling, a cooling ventilator (58) is closely attached on the internal side of the cooling block, and this ventilator is arranged on an appropriate supporting structure and can be periodically operated e.g. with an electric motor according to demand.

The auxiliary propulsion equipment is necessary because the quantity of hydrogen received from the container (8) for hydrides in a cold state is not sufficient. To release hydrogen, the granulate or powder contained in the container (8) for hydrides must be warmed up, and this process requires thermal energy. This thermal energy can preferably also be obtained from other sources, and the starting of the vehicle preferably requires propulsion equipment. For this purpose, an Otto type combustion engine having a minimum output of 15–20 kW, fueled by hydrogen, propane-butane gas or by the mixture of gasoline-ethanol or gasoline-methanol can be used. As it is indicated in FIG. 10, shock resistant gas cylinders or other fuel containers as energy sources, provided with heat protection can be placed in the fuel cylinder fixing (60), to be arranged behind the engine. They supply the auxiliary propulsion equipment, and they are provided with a starter switch dimensioned according to the requirements of an Otto engine.

The hydrogen production can be started in a way that the combustion products of the auxiliary propelling equipment are led by means of a valve through the container (8) for metallic hydrides or through its heating system; or else separate auxiliary heating pipes are led through the container (8) for metallic hydrides.

Naturally, the auxiliary propulsion equipment can also consist of an electric motor (64) of a suitable output, supplied by accumulators (65) having an appropriately high output.

For use in a vehicle, the propulsion unit designed according to the invention can be completed with energy recovering units, containing the electric energy generating aggregate (68) utilizing the braking energy of the vehicle, and its accessories. This equipment (66) used for energy recovery and utilizing braking energy contains a synchronized, computer controlled multi stage gear transmission (67), designed in a way that it actuates gears of decreasing diameter and a higher speed with increased, more intensive braking. Thus the braking energy is utilized by the generator (68) for electric energy production, using the produced energy e.g. for the charging of a battery or for the decomposition of water. The gear transmissions (67) are connected to the driving shaft (46) only at the hub of the vehicle, and they are only connected with the gear transmission (67) of the electric energy generating aggregate (68) during the braking process. The gear transmissions (67) and the electric energy generating aggregate (68) are adjusted to the torque resulting from the mass of the vehicle and the permissible braking force.

Another mode of using the braking energy is realized by the electrolyzing equipment indicated in FIG. 10A, containing the elctrolysis container (69), the filling up container (70) continuously replacing water and electrolyte, the hydrogen ducting pipe (73), the oxygen ducting pipe (74), as well as electric cables connected to the anode (71) and the cathode (72). The hydrogen obtained by electrolysis can be condensed by a condensing pump in a hydrogen collecting container, to be provided with suitable pressure regulators and ducts if necessary. The electrolysis container (69) is provided with a level measuring instrument. This container is made of shock and acid resistant, glass fibre reinforced epoxy resin, in a way maintaining a certain level of water and electrolyte, preventing a flow of the liquid resulting from the movement of the vehicle. To prevent a possible displacement of the electrolysis container (69), it is provided with a supporting structure of appropriate strength.

The container (69) contains water, as well as electrolyte (acid, alkali or salt). The replacement of water and electrolyte takes place in case of an operation with hydrogen from the water collected in container (76) and pumped into the refilling container (70), and the electrolyte is replaced from a separate electrolyte container possibly provided with a feeder.

Figure 8:
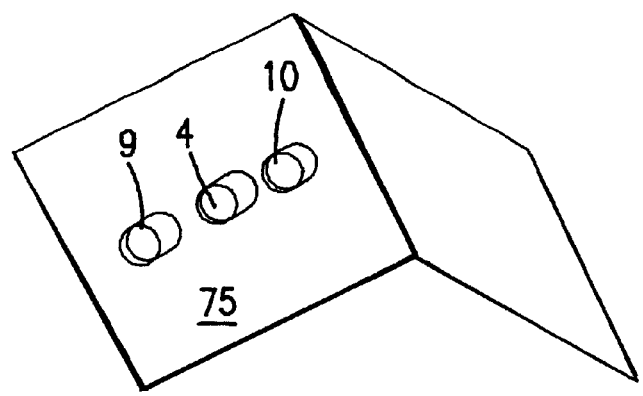
FIG. 8 is a view of the supply connections for filling up with hydrogen and cooling water.

The filling up of the container or containers (8) for metallic hydrides takes place by means of suitably designed filling up connections indicated in FIG. 8. These connections (75) are situated in the space deepened on the side of the vehicle to be closed with a door and provided with stubs that can be closed down or equipped with a bayonet lock. To prevent a loosening or displacement of the closing caps, they can be provided with fastening pins locking the closing caps. To these connections (75), leakage free hoses can be connected at the filling stations.

In one embodiment, the end of the connection hose is provided with a suitable seal and a threaded sleeve, and the filling process can only be started if the mechanism locks when the sleeve is tightened with a certain force. Locking may be signalled by a click. After filling up, the lock must be released. The removal of the sleeve can take place subsequently, to remove the connection. The connection (75) can afterwards be provided with a protecting cap.

In another possible embodiment, the connecting parts can be provided with a magnetic lock. They are united or released by a magnetic lock automatically, according to a suitable control.

The connected flexible hoses are naturally made of a material resisting the damaging effects of hydrogen and having a suitable size. For this purpose, a plastic of an appropriate quality is suggested.

The nitrogen gas arriving from the combustion chamber (1), led through the container or containers (8) for metallic hydrides and saturated with hot water vapor can be ducted through a pipeline made of a heat and corrosion resistant material. There are traps, or, more specifically, small containers used to collect the condensed water built into this pipeline. These small containers are connected with water ducting pipes, delivering the condensed water to the central water collection container. The water collected from the traps and the small containers is forwarded by a pump to the container (76) indicated in FIG. 9.

Having been freed from water vapor and steam, the nitrogen is ducted through an exhaust pipe containing a catalizator and a sound damping device if necessary.

The electric accumulators of the vehicle are continuously charged by the generator (43) driven by the turbine (77), especially if the auxiliary propulsion equipment contains an electric motor (64), supplied by the high capacity accumulators (65).

The system filling up the container or containers (8) of the vehicle with metallic hydrides is manufactured in an individual or centralized execution. In case of an individual supply system, filling up takes place from large hydrogen cylinders stored in a fixed position in the garage of the vehicle, or from a pipe network, through a hose provided with a switch, a pressure reducer and suitable connecting elements, via connection elements (75) of the vehicle. The hoses shall be placed for this purpose on the connection elements (75). Before starting the filling procedure, the hose providing the residential building with hot water and connected to the cold water side of the large water heater and provided with a circulation pump and a suitable connecting element, as well as the hose of the water heater connected to the hot water intake and provided with a suitable connecting element shall be connected to the appropriate stubs, i.e. to the cold water or hot water stubs. The filling hoses of cold water, hot water and hydrogen may be united into a common pipe bundle, for the sake of an easy operation.

Filling up takes place automatically, and this operation is automatically switched off by the control system upon completion. The connections can subsequently be disconnected at any time. In case of the construction of a hydrogen network functioning similarly to the present household or industrial gas supply networks, filling can take place through a hose provided with a pressure regulator, a switch and a connecting element.

In case of centralized supply system, stations similar to the present filling stations can be established, differing from conventional filling stations as follows.

The filling stations are provided with large tanks for the storage of pressurized or liquid hydrogen, to be connected with the hydrogen supply network if necessary. Hydrogen is filled into the vehicle according to the procedure described above.

The filling station is also connected with the hot water supply as well as heating system of the residential buildings, plants or institutions situated in the surrounding area. In this system, there are also hot water storage tanks for the purpose of thermal energy storage. In case of filling stations functioning in an area where there are no nearby hot water supply systems, and where they cannot be constructed, electric energy can be generated with the hot water obtained during filling up and collected in large heat storage containers, by means of a Rankin cycle.

In its preferable execution, the propelling unit designed according to the invention is controlled mechanically. Starting takes place with a mechanical control, with a manual switching on, actuating a choke and a foot operated gas feeder. These operations can be performed with the ignition switch, the choke and the accelerator, arranged identically to those of the traditional motor vehicles. The individual operating parameters can be displayed with appropriate instruments. The automatic control takes place by means of a computer, a microprocessor, connected to suitable mechanical and electrical sensors, intervention organs, switches, displays, and safety units.

What is claimed is:

1. A steam turbine type propulsion unit for use with gaseous fuel, comprising:
    a gas supply unit, comprising a supply container (8), a gas container (18) connected to the supply container, a filling duct connected to the supply container, and a gas supply duct connected to the supply container;
    an air feeding unit (20), provided with instruments regulating air flow, the air feeding unit being supplied with air through an air filter (25);
    a steam generator (1), comprising a combustion chamber surrounded by a ceramics wall (35a), said steam generator being connected to the gas supply unit and the air feeding unit (2), said steam generator having steam generating cooling pipes (31) adapted for steam generation disposed within the ceramics wall; and
    a steam turbine (77) connected to the steam generator and driven by steam obtained from the steam generating cooling pipes (31), the steam turbine providing power output through a shaft (36).

2. A propulsion unit according to claim 1, wherein the supply container (8) is a hydride container (8) containing a load (7) comprising at least one of a metal granulate and powder containing hydrogen in the form of a metallic hydride.

3. A propulsion unit according to claim 2, wherein the above mentioned steam generating unit (1) contains steam generating pipes (31) made of a hydrogen resistant metal alloy.

4. A propulsion unit according to claim 2, further comprising an electrolysation unit structured and arranged to regain a part of the hydrogen transformed into water by means of burning, the electrolysation unit comprising:
    an electrolysis container (69),
    a container (70) for continuous electrolyte and water replacement into the electrolysis container,
    electric cables (71, 72) disposed in the electrolysis container and supplied with an electrical potential to perform electrolysis,
    ducting pipes for hydrogen (73) and oxygen (74) created by electrolysis, the hydrogen duct being provided with a pressure regulator and valve,
    a hydrogen collecting container connected to the hydrogen ducting pipe,
    a pump for hydrogen condensation connected to the hydrogen collecting container,
    a cylinder for hydrogen storage connected to the hydrogen condensation pump.

5. The propulsion unit according to claim 2, wherein the hydride container comprises:
    internal (12) and external (11) walls separated by a water space, the internal wall (12) being made of a heat resistant material, an internal surface of the interior wall having an anti-corrosive coating, a low point of the water space being connected to a fill/drain pipeline (9), an upper part (14) of the water space being to a hot water ducting pipeline (10) having an anti-corrosive coating, an interior of the hydride container being limited by the internal wall (12) and containing the load (7);

pipes (6) with perforated walls disposed within the interior of the hydride container, said perforated pipes (6) being connected to a common pipe (4) adapted for filling up with hydrogen, said common pipe having a closing element (76); and a closing element connected to the common pipe, hot water ducting pipeline, and the fill/drain pipeline;

wherein an upper part of the internal wall (12) is connected with the gas supply duct (15) through which hydrogen is obtained from the load (7).

6. A propulsion unit according to claim 5, wherein the gas supply duct (15) of the hydride container (8) is connected through pressure and flow regulation elements (16) and a pump (17) to at least one said gas container (18), an output of the gas container (18) being connected to the ceramic combustion chamber (1) through a pressure regulating valve (19), the air feeding unit (20), a preheater (28), a distributor (22), and through at least one jet (23).

7. A propulsion unit according to claim 4, wherein the jet (23) comprises a hydrogen resistant and heat resistant metal alloy, surrounded by an ignition plate comprising platinum.

8. A propulsion unit according to claim 4, wherein the jet (23) is provided with a narrowed output hole (23c, 23d).

9. A propulsion unit according to claim 6, wherein an output cross section of the jet (23) is equal to a remaining cross section of the let (23).

10. A propulsion unit according to claim 4, wherein the jets (23) of hydrogen intake and the jets (23) of air intake are arranged alternately, and are connected to separate chambers used for the distribution of the hydrogen and the air.

11. A propulsion unit according to claim 1, wherein the air feeding unit comprises a suction pipe (24) for air intake through the connected air filter (25), which is connected to a pump (26) and an air storage container (27) provided with a pressure regulator, which is connected through a preheater (28) to a distribution chamber, which is connected through at least one jet (23) to the combustion chamber (1) made of ceramics.

12. A propulsion unit according to claim 1, wherein an internal ceramics wall (35a) of the combustion chamber (1) contains steam generating spiral pipes (31), an exterior of the combustion chamber (1) having a heat insulating coating (35).

13. A propulsion unit according to claim 1, wherein the combustion chamber (1) is provided with an internal ceramics wall (35a) with a hollow portion disposed therein, the hollows being adapted for steam generation, the hollow ceramics wall (35a) having an exterior heat insulating coating (35b).

14. A propulsion unit according to claim 1, wherein the steam turbine (77) is connected with the input (53) of a three stage, high capacity cooling block (48), stages two and three of this cooling block being able to be bridged over by valves (55), an output (54) of the cooling block (48) being connected through a collecting container (56) and pump (57) to a supply water container (40), the supply water container (40) being connected to the cooling pipes (31) for steam generating, through a supply pump (41).

15. A propulsion unit according to claim 1, wherein the power output shaft (36) of the steam turbine (77) is connected to one of an input shaft (47) of a gear box (44) connected to an auxiliary driving unit and a generator (43) for electric energy production.

16. A propulsion unit according to claim 11, wherein the auxiliary driving unit contains an electric motor (64).

17. A propulsion unit according to claim 11, wherein the auxiliary driving unit contains a combustion engine (59).

18. A propulsion unit according to claim 1, wherein the steam generator (1) and the steam turbine (77) are arranged in a common casing (78) provided with heat insulation.

19. A propulsion unit according to claim 1, disposed within a motor vehicle, the motor vehicle being provided with wheels and wheel suspension structures, the suspension structures being provided with a generator (68) and a gear drive (67) with multiple gear ratios for coupling the generator with the wheels of the vehicle during braking.

20. A steam generator propelled by gaseous fuel, said steam generator (1) having a combustion chamber surrounded by an internal ceramics wall (35a) having a frustum shape; the ceramics wall (35a) having cooling pipes (31) used for steam generation and arranged in a spiral, the steam generating combustion chamber (1) having a heat insulating coating (35b) on its exterior, a wider end of the combustion chamber (1) being connected with jets (23) arranged practically in a plain sheet, another end being connected with a pipe (2) ducting combustion products.

21. A steam generator according to claim 20, wherein the cooling pipes comprise hollows disposed within the internal ceramics wall (35a).

22. A steam generator according to claim 20, further comprising a reheating pipe network (34) disposed within the combustion chamber, the reheating pipe network comprising a hydrogen resistant metal alloy.

23. A propulsion unit according to claim 20, wherein at least one said jet is surrounded by an ignition plate made of platinum.

* * * * *